(12) United States Patent
Shiragaki

(10) Patent No.: US 7,043,662 B2
(45) Date of Patent: May 9, 2006

(54) COMMUNICATION DEVICE THAT PERFORMS AUTOMATIC FAILURE RECOVERY AND AUTOMATIC FAILURE RECOVERY METHOD

(75) Inventor: Tatsuya Shiragaki, Tokyo (JP)

(73) Assignee: NEC Corporation, Tokyo (JP)

( * ) Notice: Subject to any disclaimer, the term of this patent is extended or adjusted under 35 U.S.C. 154(b) by 548 days.

(21) Appl. No.: 10/132,385

(22) Filed: Apr. 26, 2002

(65) Prior Publication Data
US 2002/0162045 A1    Oct. 31, 2002

(30) Foreign Application Priority Data
Apr. 27, 2001    (JP)    ............... 2001-132784

(51) Int. Cl.
*G06F 11/00*    (2006.01)
(52) U.S. Cl. ............... 714/4; 398/1; 370/216
(58) Field of Classification Search ............... 714/4, 714/2, 3; 398/1; 370/216, 225
See application file for complete search history.

(56) References Cited

U.S. PATENT DOCUMENTS

| | | | |
|---|---|---|---|
| 5,740,357 A * | 4/1998 | Gardiner et al. ............ | 714/57 |
| 6,675,324 B1 * | 1/2004 | Marisetty et al. ............ | 714/30 |
| 6,718,480 B1 * | 4/2004 | Ogura et al. ............... | 714/4 |
| 6,760,860 B1 * | 7/2004 | Fong et al. ................. | 714/4 |
| 2001/0032325 A1 * | 10/2001 | Fong et al. ................. | 714/18 |
| 2003/0163555 A1 * | 8/2003 | Battou et al. ............... | 709/223 |

FOREIGN PATENT DOCUMENTS

JP    2000-278285    10/2000

OTHER PUBLICATIONS

ITU-T Recommendation G.709/Y.1331, Series G: Transmission Systems and Media, Digital Systems and Networks, Interfaces for the optical transport network, International Telecommunication Union (Feb. 2001) pp. 16-17.
ITU-T Recommendation G.872 (Draft 1.6), "Architecture of optical transport networks," ITU-T Study Group 13 (Oct. 2001), pp. 38-42.

* cited by examiner

*Primary Examiner*—Robert Beausoliel
*Assistant Examiner*—Marc Duncan
(74) *Attorney, Agent, or Firm*—Foley & Lardner LLP

(57) ABSTRACT

If failure is detected in multiple layers, a failure detection recovery processing unit is activated simultaneously in each layer and performs operations up to immediately before switching a main signal. The first layer to reach that stage notifies the other layer of this fact through inter-layer failure recovery information communication terminal and processing units to stop the failure recovery operation of the other layer. The other layer sends back a response to it through the inter-layer failure recovery information communication terminal and processing units, and the layer that first reaches the stage up to immediately before actually switches the main signal based on the result of the response.

34 Claims, 13 Drawing Sheets

COMMUNICATION DEVICE THAT PERFORMS AUTOMATIC FAILURE RECOVERY AND AUTOMATIC FAILURE RECOVERY METHOD

BACKGROUNDS OF THE INVENTION

1. Field of the Invention

The present invention relates to a communication device that performs automatic failure recovery and an automatic failure recovery method and, more particularly, to a communication device and an automatic failure recovery method for realizing shortening of failure recovery time.

2. Description of the Related Art

Concomitant with the growth in communication demands, various layers exist in a communication network, including the Optical Transport Network (OTP) layer (see ITU-T Recommendation G.709 Ver.1), the SDH layer, the PDH layer, the IP layer, etc., which are contained in a hierarchical relationship.

For example, an IP packet is mapped to an SDH signal, and it is further mapped to an OTN frame.

In addition, in some cases, to address a failure in each layer, each layer has a failure recovery function.

For example, the OTN layer has a failure recovery function such as OCh SPRing (see ITU-T Recommendation Draft G.872 ver1.4 or later), and the SDH layer has a failure recovery function such as MS SPRing.

The IP layer has a function that bypasses an IP packet automatically through a routing protocol in the event of a communication failure.

Thus, in a system in which each layer has its own failure recovery function, if each layer is not aware of the other layers and is operated independently, in some cases, due to switching in each layer, a conflict is generated in the network topology recognized by each layer, and ultimately, failures cannot be recovered.

In the past, a configuration such as the one shown in FIG. 13 was conceived as a device configuration that solves the complexity of failure recovery in systems consisting of multiple layers (Japanese Unexamined Patent Publication (Kokai) No. 2000-278285).

In FIG. 13, reference numeral 1201 is a main network management system (Main-NMS), reference numerals 1202 through 1204 are sub network management systems, reference numeral 1227 is a manager, reference numeral 1228 is an agent, and reference numerals 1224 through 1226 are groups of path objects in mutually different layers corresponding to SDH_VC12-TU12, SDH_VC3-AU3, etc.

Further, in a bus failure recovery function 1220, reference numeral 1221 is a communication path failure reception unit, reference numeral 1222 is a communication path recovery target selection unit, and reference numeral 1223 is a communication path recovery processing unit.

All of the above is included in the main network management system 1201.

Then, if a failure occurs in the system and if the failure is detected by the communication path failure reception unit 1221, which layer and which auxiliary paths will be used for failure recovery is calculated and selected in the communication path recovery target selection unit 1222, by referring to failure information, path usage rate information, etc., on all layers, to perform failure recovery processing of the selected layer in the communication path recovery processing unit 1223.

With the configuration as described above, if the multiple layers had a failure recovery function, coordinated operation of failure recovery could be performed.

In a similar problem, as shown in FIG. 14, there are cases where, although there is only one path layer to handle, i.e. a path 1300, multiple failure recovery areas may exist therein.

In FIG. 14, reference numeral 1300 is the path, A and B are failure recovery areas, and reference numerals 1303 through 1306 are nodes.

Even when multiple failure recovery areas exist with respect to one path, as in the case of the failure recovery areas A and B, a conventional method that uses an NMS used for cases involved in multiple layers can be applied as a method that coordinates the multiple failure recovery areas in a network involved in multiple failure recovery areas.

As described above, the conventional communication system had such problems as the ones described below.

When involved in multiple layers, if the conventional method is used, since the main network management system (NMS) has to perform failure recovery processing by referring to failure information, path usage rate information, etc., on all layers, the load on NMS increases, the size of the NMS device increases, and the cost rises.

In addition, since one system, i.e. the NMS, performs everything from selection of a bypass layer to setting of auxiliary paths, the failure cannot be handled if a failure occurs in the NMS.

Further, it takes time to search for the most suitable layer such that as a whole, there is a delay in the failure recovery time.

When the conventional method that uses an NMS used for cases involved in multiple layers is applied as a method that coordinates multiple failure recovery areas in the network involved in multiple failure recovery areas with respect to one path, since the NMS has to perform failure recovery processing by referring to failure information, path usage rate information, etc., on all layers, the load on NMS increases, the size of the NMS device increases, and the cost rises.

In addition, as described above, since one system, i.e. the NMS, performs everything from selection of a bypass failure recovery area to setting of auxiliary paths, the failure cannot be handled if a failure occurs in the NMS. Further, also in this case, it takes time to search for the most suitable failure recover area such that as a whole, there is a delay in the failure recovery time.

SUMMARY OF THE INVENTION

A first object of the present invention is to provide a communication device and an automatic failure recovery method that solve the disadvantages of the conventional art, allow omission of calculations related to layer optimality that calculate which layer is the best suited to perform failure recovery on, with respect to a network in which multiple failure recovery areas exist, and allow shortening of failure-recovery time to be realized.

A second object of the present invention is to provide a communication device and an automatic failure recovery method capable of suppressing the up-scaling and high cost of a main network management system, which do not apply loads to the main network management system owing to the fact that failure recovery operations between layers or between failure recovery areas can be adjusted without going through the main network management system.

A third object of the present invention is to provide a communication device and an automatic failure recovery method that do not require a centralized control by the main network management system, by distributing and processing by a means for processing failure recovery information between the layers that is given between each layer or failure recovery information between the failure recovery areas that is given between each failure recovery areas.

A fourth object of the present invention is to provide a communication device and an automatic failure recovery method that allow omission of calculations related to layer optimality that calculate which failure recovery area is the best suited to use also with respect to a network in which multiple failure recovery areas exist with respect to one path, and allow shortening of failure recovery time to be expected.

According to the first aspect of the invention, a communication device having a failure recovery function for multiple layers, comprises failure detection and recovery processing means for processing failure detection and failure recovery of each layer, and failure recovery information processing means for performing communication terminal and information processing of failure recovery information between multiple layers, the failure detection recovery processing means of each layer being activated when a failure is detected in multiple layers, operations being performed up to immediately before switching a main signal, the first layer to reach the stage immediately before notifying the other layer of this fact through the failure recovery information processing means to stop the failure recovery operation of the other layer, the other layer sending back an authorization response through the failure recovery information means, and the first layer to reach the stage immediately before actually switching the main signal based on the response result.

According to the second aspect of the invention, a communication device having a failure recovery function in a network consisting of multiple layers, each communication device consisting of, failure detection and recovery processing means for processing failure detection and failure recovery of each layer, and failure recovery information processing means for performing communication terminal and information processing of failure recovery information between layers in which a failure is recovered by the other communication device, the failure detection processing means of each communication device being activated when a failure is detected in multiple layers, operations being performed up to immediately before switching a main signal, the first layer to reach the stage immediately before notifying the communication device of the other layer of this fact through the failure recovery information processing means to stop the failure recovery operation of the other layer, the communication device of the other layer sending back an authorization response through the failure recovery information means, and the first layer to reach the stage immediately before actually switching the main signal based on the response result.

In the preferred construction, one previously mentioned layer is set to start failure recovery operation in priority over the other layer, the layer notifies the other layer of the fact through the failure recovery information processing means when recognizing failure recovery fails, and the other layer starts the failure recovery operation.

In another preferred construction, the device further comprises timer means for each multiple layers, the failure recovery operation being interrupted when there is no authorization response notification from the other layer within a specified time.

In another preferred construction, the device comprises timer means only on the layer which is not set to perform the failure recovery operation in priority, the layer being notified of a stop request during failure recovery operation at the time of exceeding a standby time set by the timer means, and the failure recovery operation being started at the time of receiving the response from the layer.

According to the third aspect of the invention, an automatic failure recovery method of a communication network having a failure recovery function for multiple layers, comprising the steps of when a failure is detected in the multiple layers, starting each failure recovery operation in the multiple layers, and completing the failure recovery operation only in the layer that ended the failure recovery operation in advance.

According to another aspect of the invention, an automatic failure recovery method of a communication network having a failure recovery function for multiple layers, comprising the steps of when a failure is detected in the multiple layers, starting the failure recovery operation only in a specific layer having priority, and starting the failure recovery operation in the other layer, by recognizing that the specific layer having priority failed in the failure recovery operation, when the other layer recognized the failure recovery request the other layer was notified of.

According to another aspect of the invention, an automatic failure recovery method of a communication network having a failure recovery function for multiple layers, comprising the steps of when a failure is detected in the multiple layers, starting the failure recovery operation only in a specific layer having priority, and starting the failure recovery operation in the other layer when the time since the failure was detected in the other layer exceeds a preset time.

According to another aspect of the invention, an automatic failure recovery method of a communication network having a failure recovery function for multiple layers, comprising the steps of when a failure is detected in the multiple layers, starting the failure recovery operation only in a specific layer having priority, and starting the failure recovery operation in the other layer, by recognizing that the specific layer having priority failed in the failure recovery operation, when the other layer recognized the failure recovery request the other layer was notified of, or when the time since the failure was detected in the other layer exceeds a preset time.

According to another aspect of the invention, a communication device having a failure recovery function of multiple failure recovery areas on a network, comprises failure detection recovery processing means for processing the failure detection and failure recovery of each failure recovery area, and failure recovery information processing means for performing communication terminal and information processing of failure recovery information between multiple failure recovery areas, the failure detection recovery processing means in each failure recovery area being activated when failure is detected in the multiple failure recovery areas to perform operations up to immediately before switching a main signal, the first failure recovery area to reach a stage immediately before notifying the other failure recovery area of this fact through the failure recovery information processing means to stop the failure recovery operation of the other failure recovery area, the other failure recovery area sending back an authorization response through the failure recovery information means, and the first failure recovery area to reach the stage immediately before actually switching the main signal based on the response result.

According to another aspect of the invention, a communication device having a failure recovery function in a network having multiple failure recovery areas, comprises each communication device consisting of, failure detection recovery processing means for processing the failure detection and failure recovery of each failure recovery area, and failure recovery information processing means for performing communication terminal and information processing of failure recovery information between failure recovery areas in which a failure is recovered by the other communication device, the failure detection recovery processing means in each communication device being activated when failure is detected in the multiple failure recovery areas to perform operations up to immediately before switching a main signal, the first failure recovery area to reach a stage immediately before notifying the communication device of the other failure recovery area of this fact through the failure recovery information processing means to stop the failure recovery operation of the communication device of the other failure recovery area, the communication device of the other failure recovery area sending back an authorization response through the failure recovery information processing means, and the first failure recovery area to reach the stage immediately before actually switching the main signal based on the response result.

In the preferred construction, one previously mentioned failure recovery area is set to start failure recovery operation in priority over the other failure recovery area, the failure recovery area notifies the other failure recovery area of the fact through the failure recovery information communication terminal and processing means when recognizing failure recovery fails, and the other failure recovery area starts the failure recovery operation.

In another preferred construction, the communication device comprises timer means for each of the multiple failure recovery areas, the failure recovery operation being interrupted when there is no authorization response notification from the other failure recovery area within a specified time.

In another preferred construction, the device comprises timer means only on the failure recovery area which is not set to perform the failure recovery operation in priority, the failure recovery area being notified of a stop request during failure recovery operation at the time of exceeding a standby time set by the timer means, and the failure recovery operation being started at the time of receiving the response from the failure recovery area.

According to another aspect of the invention, an automatic failure recovery method of a communication network having a failure recovery function for multiple failure recovery areas, comprising the steps of when a failure is detected in the multiple failure recovery areas, starting each failure recovery operation in the multiple failure recovery areas, and completing the failure recovery operation only in the failure recovery area that ended the failure recovery operation in advance.

According to another aspect of the invention, an automatic failure recovery method of a communication network having a failure recovery function of multiple failure recovery areas, comprising the steps of when a failure is detected in the multiple failure recovery areas, starting the failure recovery operation only in a specific failure recovery area having priority, and starting the failure recovery operation in the other failure recovery area, by recognizing that the specific failure recovery area having priority failed in the failure recovery operation, when the other failure recovery area recognized the failure recovery request the other failure recovery area was notified of.

According to another aspect of the invention, an automatic failure recovery method of a communication network having a failure recovery function of multiple failure recovery areas, comprising the steps of when a failure is detected in the multiple failure recovery areas, starting the failure recovery operation only in a specific failure recovery area having priority, and starting the failure recovery operation in the other failure recovery area when the time since the failure was detected in the other failure recovery area exceeds a preset time.

According to another aspect of the invention, an automatic failure recovery method of a communication network having a failure recovery function of multiple failure recovery areas, comprising the steps of when a failure is detected in the multiple failure recovery areas, starting the failure recovery operation only in a specific failure recovery area having priority, and starting the failure recovery operation in the other failure recovery area, by recognizing that the specific failure recovery area having priority failed in the failure recovery operation, when the other failure recovery area recognized the failure recovery request the other failure recovery area was notified of, or when the time since the failure was detected in the other failure recovery area exceeds a preset time.

According to another aspect of the invention, a communication network system in which a communication device having a failure recovery function of multiple layers is placed as a node, the communication device comprises failure detection recovery processing means for processing failure detection and failure recovery of each layer, and failure recovery information processing means for performing communication terminal and information processing of failure recovery information between the multiple layers, the failure detection recovery processing means in each layer being activated when failure is detected in the multiple layers to perform operations up to immediately before switching a main signal, the first layer to reach a stage immediately before notifying the other layer of this fact through the failure recovery information processing means to stop the failure recovery operation of the other layer, the other layer sending back an authorization response through the failure recovery information processing means, and the first layer to reach the stage immediately before actually switching the main signal based on the response result.

According to another aspect of the invention, a communication network system placed as a communication device node having a failure recovery function in a network consisting of multiple layers, each communication device consisting of failure detection recovery processing means for processing failure detection and failure recovery of each layer, and failure recovery information processing means for performing communication terminal and information processing of failure recovery information between layers in which a failure is recovered by the other communication device, the failure detection recovery processing means in each communication device being activated when failure is detected in the multiple layers to perform operations up to immediately before switching a main signal, the first layer to reach a stage immediately before notifying the communication device of the other layer of this fact through the failure recovery information processing means to stop the failure recovery operation of the other layer, the communication device of the other layer sending back an authorization response through the failure recovery information means, and the first layer to reach the stage immediately before actually switching the main signal based on the response result.

In the preferred construction, one previously mentioned layer is set to start failure recovery operation in priority over the other layer, the layer notifies the other layer of the fact through the failure recovery information processing means when recognizing failure recovery fails, and the other layer starts the failure recovery operation.

In another preferred construction, the communication device comprises timer means for each multiple layers, the failure recovery operation being interrupted when there is no authorization response notification from the other layer within a specified time.

In another preferred construction, the communication device comprises timer means only on the layer which is not set to perform the failure recovery operation in priority, the layer being notified of a stop request during failure recovery operation at the time of exceeding a standby time set by the timer means, and the failure recovery operation being started at the time of receiving the response from the layer.

According to a further aspect of the invention, a communication network system that has a communication device having a failure recovery function of multiple failure recovery areas on a network, the communication device comprises failure detection recovery processing means for processing the failure detection and failure recovery of each failure recovery area, and failure recovery information processing means for performing communication terminal and information processing of failure recovery information between the multiple failure recovery areas, the failure detection recovery processing means in each failure recovery area being activated when failure is detected in the multiple failure recovery areas to perform operations up to immediately before switching a main signal, the first failure recovery area to reach a stage immediately before notifying the other failure recovery area of this fact through the failure recovery information processing means to stop the failure recovery operation of the other failure recovery area, the other failure recovery area sending back an authorization response through the failure recovery information means, and the first failure recovery area to reach the stage immediately before actually switching the main signal based on the response result.

According to a further aspect of the invention, a communication network system that has a communication device having a failure recovery function on a network having multiple failure recovery areas, each communication device comprises, failure detection recovery processing means for processing the failure detection and failure recovery of each failure recovery area; and failure recovery information processing means for performing communication terminal and information processing of failure recovery information between failure recovery areas in which a failure is recovered by the other communication device, the failure detection recovery processing means in each communication device being activated when failure is detected in the multiple failure recovery areas to perform operations up to immediately before switching a main signal, the first failure recovery area to reach a stage immediately before notifying the communication device of the other failure recovery area of this fact through the failure recovery information processing means to stop the failure recovery operation of the communication device of the other failure recovery area, the communication device of the other failure recovery area sending back an authorization response through the failure recovery information processing means, and the first failure recovery area to reach the stage immediately before actually switching the main signal based on the response result.

According to a still further aspect of the invention, an automatic failure recovery program controlling a communication device on a communication network having a failure recovery function for multiple layers to perform failure recovery processing, comprising the functions of a function starting each failure recovery operation in the multiple layers when failure is detected in the multiple layers, and a function completing the failure recovery operation only in the layer that ended the failure recover operation in advance.

According to a still further aspect of the invention, an automatic failure recovery program controlling a communication device on a communication network having a failure recovery function for multiple layers to perform failure recovery processing, comprising the functions of a function starting only the failure recovery operation in the specific layer having priority when failure is detected in the multiple layers, and a function starting the failure recovery operation in the other layer, by recognizing that the specific layer having priority failed in the failure recovery operation, when the other layer recognized the failure recovery request the other layer was notified of.

According to a still further aspect of the invention, an automatic failure recovery program controlling a communication device on a communication network having a failure recovery function for multiple layers to perform failure recovery processing, comprising the functions of a function starting only the failure recovery operation in the specific layer having priority when failure is detected in the multiple layers; and a function starting the failure recovery operation in the other layer when the time since the failure was detected in the other layer exceeds a preset time.

According to a still further aspect of the invention, an automatic failure recovery program controlling a communication device on a communication network having a failure recovery function for multiple layers to perform failure recovery processing, comprising the functions of a function starting only the failure recovery operation in the specific layer having priority when failure is detected in the multiple layers, and a function starting the failure recovery operation in the other layer, by recognizing that the specific layer having priority failed in the failure recovery operation, when the other layer recognized the failure recovery request the other layer was notified of, or when the time since the failure was detected in the other layer exceeds a preset time.

According to the present invention, by starting failure recovery operation of any layer after a failure has been detected without calculating which layer is the best suited to perform failure recovery on upon detection of the failure and, if the failure cannot be recovered in the layer, performing the failure recovery in the other layer, or by starting failure recovery immediately after each layer has detected the failure, and adjusting subsequently (selecting a bypass to a layer that seems to recover the failure faster), the calculation related to layer optimality can be omitted and shortening of the failure recovery time can be expected.

In addition, since the failure recovery operation between the layers can be adjusted without going through the NMS, up-scaling of the NMS can be prevented without applying loads to the NMS.

Further, since the centralized control by the NMS is unnecessary by distributing and processing by a means for processing failure recovery information between the layers that is given between each layer, the operation can be performed in the event of a failure of the NMS.

Concerning the failure recovery area, by starting failure recovery operation of any failure recovery area after a failure has been detected without calculating which failure recovery area is the best suited to perform failure recovery on upon detection of the failure and, if the failure cannot be recovered in the failure recovery area, performing the failure recovery in the other failure recovery area, or by starting failure recovery immediately after each failure recovery area has detected the failure, and adjusting subsequently (selecting a bypass to a failure recovery area that seems to recover the failure faster), the calculation related to failure recovery area optimality can be omitted and shortening of the failure recovery time can be expected.

In addition, since the failure recovery operation between the failure recovery areas can be adjusted without going through the NMS, up-scaling of the NMS can be prevented without applying loads to the NMS.

Further, since the centralized control by the NMS is unnecessary by distributing and processing by a means for processing failure recovery information between the failure recovery areas that is given between each failure recovery area, the operation can be performed in the event of a failure of the NMS.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Figure 1:
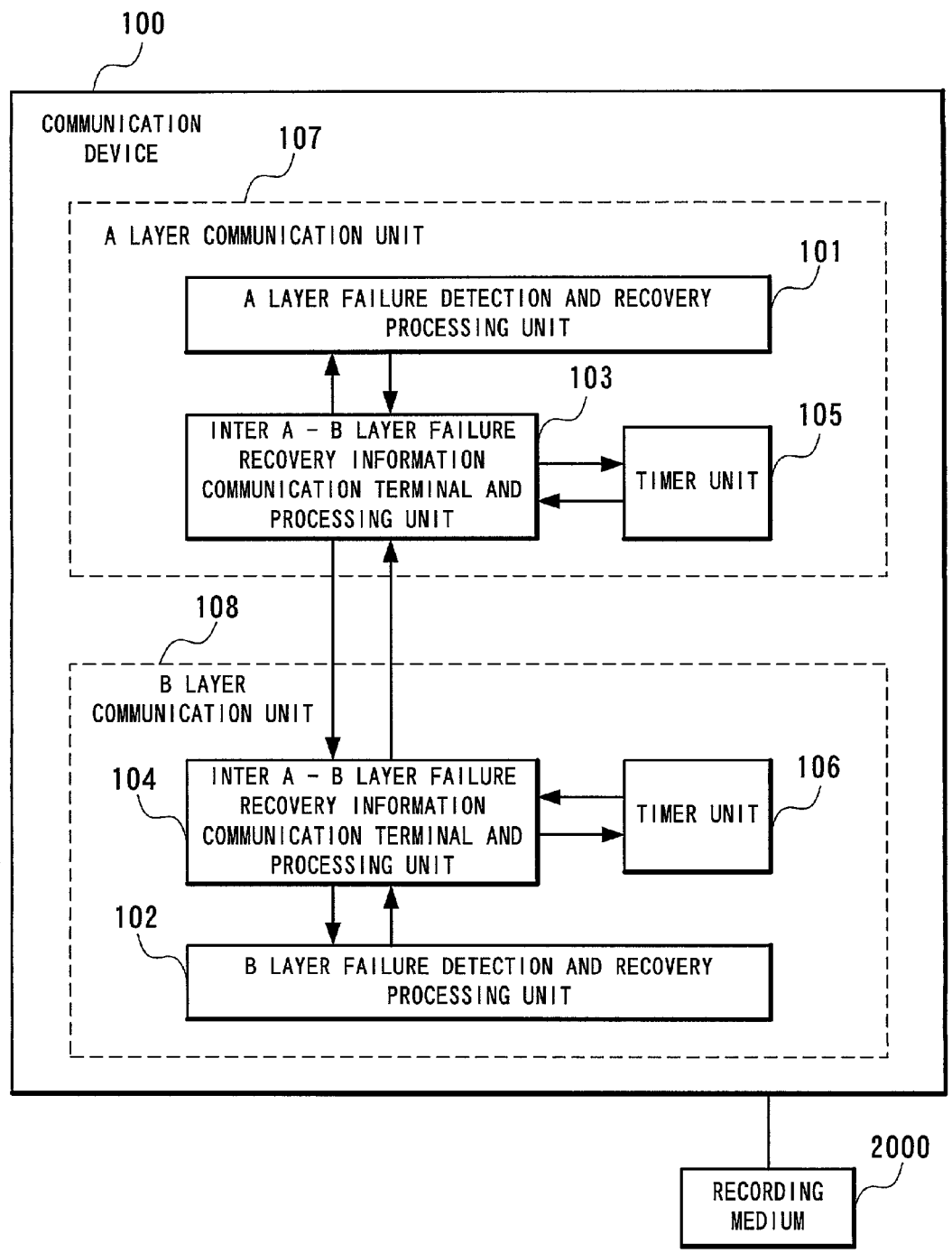
FIG. 1 is a block diagram showing a configuration of a communication device according to a first embodiment of the present invention.

FIG. 1 is a block diagram showing the configuration of a communication device according to a first embodiment of the present invention. In this embodiment, a communication device achieves both functions of failure recovery in an A layer and failure recovery in a B layer.

In FIG. 1, a communication device 100 having an automatic failure recovery function according to the present invention consists of an A layer communication unit 107 and a B layer communication unit 108. Here, for the A layer and the B layer, a case may be considered in which, for example, the A layer is an IP layer (layer 3), and the B layer is an optical path layer.

In the A layer communication unit 107 and the B layer communication unit 108, reference numeral 101 is an A layer failure detection and recovery processing unit, and reference numeral 102 is a B layer failure detection and recovery processing unit.

Let assume now that the communication device 100 is a terminal point of a failure recovery section in both layers A and B. That is, if failure is detected as a result of monitoring signals in the A layer, by operating the A layer failure detection and recovery processing unit 101, failure recovery operation in the A layer can be activated.

On the other hand, if failure is detected as a result of monitoring signals in the B layer, by operating the B layer failure detection and recovery processing unit 102, failure recovery operation in the B layer can be activated.

Reference numeral 103 is an inter A-B layer failure recovery information communication terminal and processing unit (A layer side), and reference numeral 104 is an inter A-B layer failure recovery information communication terminal and processing unit (B layer side).

These can communicate and terminate using an IP packet, and can also represent information with a value any byte within a frame (as for the K1/K2 byte of an SDH overhead).

Reference numerals 105 and 106 are timer units, and measure time.

If a failure is detected in multiple layers, the A layer failure detection and recovery processing unit 101 and the B layer failure detection and recovery processing unit 102 are activated simultaneously but individually, and perform operations up to immediately before switching of a main signal.

The layer that first reaches this stage (immediately before stage) notifies the other layer of this fact through the inter A-B layer failure recovery information communication terminal and processing units 103 and 104 to stop the failure recovery operation of the other layer.

The other layer sends back a response to this through the inter A-B layer failure recovery information communication terminal and processing units 103 and 104, and the layer that first reaches the stage up to immediately before actually switches the main signal based on the result of the response.

As a preventive measure for the case where there is no response from the other layer, the time from failure detection is measured by the timer units 105 and 106, then, after a preset time has expired, the layer seeks a decision from an operator.

Figure 2:
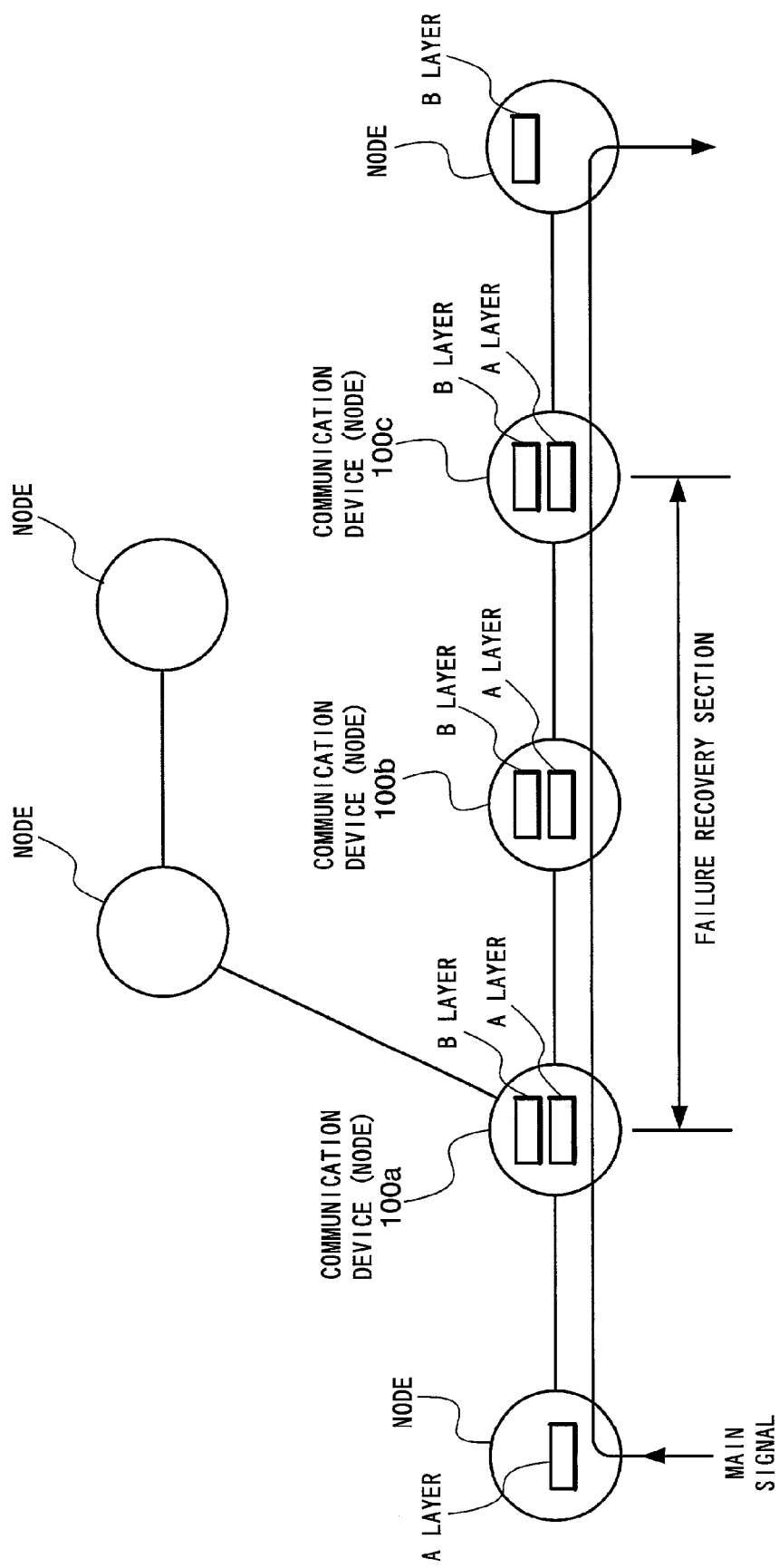
FIG. 2 is a drawing showing an example of a communication network system in which the communication device is disposed according to the first embodiment.

FIG. 2 is a drawing showing a configuration of a communication network system that has adopted the communication device according to the above-mentioned embodiment. FIG. 2 shows a communication network system in which communication devices 100a, 100b, 100c according to the present invention are placed as nodes on a failure recovery section in a network consisting of the layers A and B. In this system, each of the communication devices 100a, 100b, 100c placed on the failure recovery section have the configuration shown in FIG. 1, and perform the failure recovery operation in the section.

Figure 3:
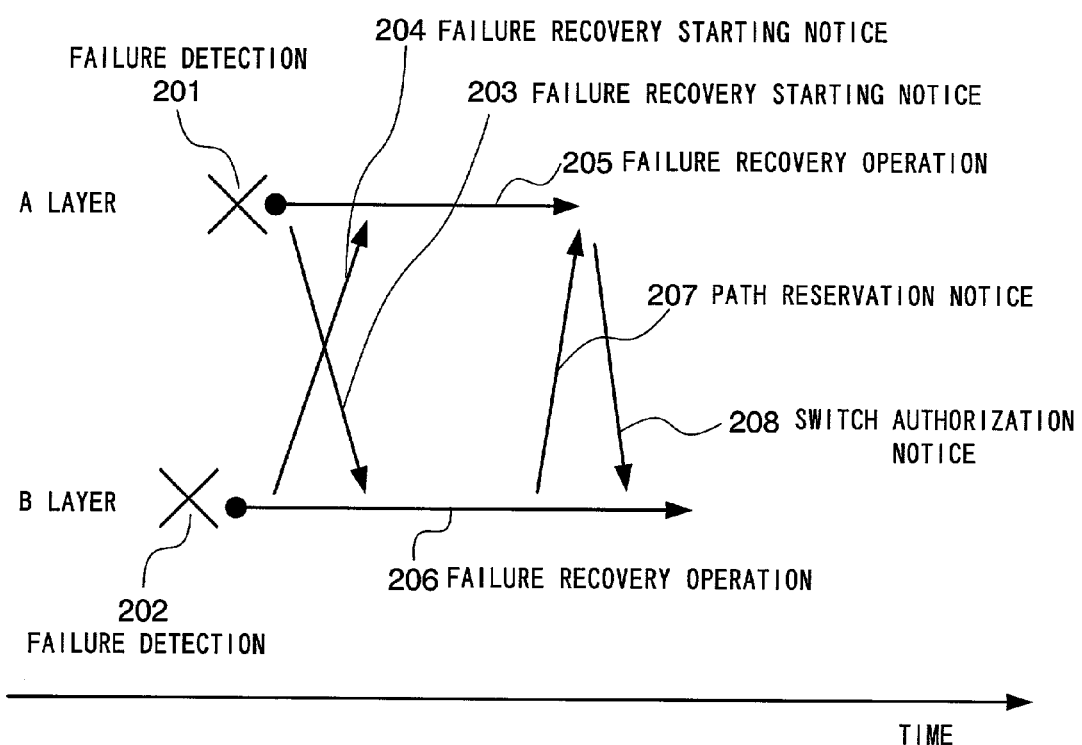
FIG. 3 is a timing chart describing a failure recovery method according to the first embodiment of the present invention.

Next, the operation of the communication device according to the above-mentioned first embodiment when failure is detected in multiple layers with reference to FIG. 3.

When the failure is detected in only one layer, the failure recovery is performed in that layer only; however, a case where failures are detected in both layers will be examined below.

In FIG. 3, the horizontal axis is the time axis; operation of the A layer is shown in the upper portion, and operation of the B layer is shown in the lower portion.

Reference numerals 201 and 202 in the drawing show the time of failure detection in each layer. Reference numerals 205 and 206 show that the failure recovery operations are in progress, respectively in the A layer and the B layer. Reference numerals 203, 204, 207 and 208 show the exchange of failure recovery information between the layers.

In the A layer, failure detection was performed by an A layer failure detection and recovery processing unit 101 at time 201. On the other hand, in the B layer, the failure detection was performed by a B layer failure detection and recovery processing unit 102 at time 202.

Each layer starts the failure recovery operation simultaneously.

At this time, the layers communicate with each other the fact that failure recovering has started as failure recovery starting notices 203 and 204 using the inter A-B layer failure recovery information communication terminal and processing units 103 and 104.

Each layer perform the operations up to immediately before actually switching the main signal. For example, it is set under a condition where only a path is determined and the information is stored in each node, but switching has not been performed actually.

Now, the layer that first reaches the condition immediately before actually switching the main signal is assumed to be the B layer, as an example.

Since the B layer first reached the condition immediately before actually switching the main signal, this fact is communicated to the other layer (A layer) as a path reservation notice 207.

The A layer that received the path reservation notice 207 stops the failure recovery operation at that stage, and releases the path or the like which have been reserved until now.

Then, the A layer sends the B layer a switch authorization notice 208 as a message indicating that the main signal may be actually switched.

The B layer that received the switch authorization notice 208 actually switches the main signal and completes the failure recovery operation in the B layer.

The automatic failure recovery method performed by each layer to achieve the operation shown in FIG. 3 will be described with reference to a flowchart in FIG. 4.

When failure is detected in a step 301, the failure recovery operation starts in the layer (step 302).

Then, the failure recovery starting notice which is a message indicating that the failure recovery operation has started is send to the other layer concerned (step 303).

Here, because it is not necessary to consider the interaction between the two layers when a failure recovery starting message has not been received from the other layer, the failure recovery is performed only on the own layer (steps 304 and 314).

Next, a case where a failure recovery starting notice has been received from the other layer ("Yes" in step 304) will be described below.

When the other layer sends a path reservation notice, which is a message indicating that the other layer has prepared the operations up to immediately before switching the main signal, which is immediately before completion of the failure recovery (for example, a condition where only the path is determined and the information is stored in each node, but switching has not been performed actually) (step 305), the layer releases the path or the like which has been reserved until now (step 310), and stops failure recovery on the own layer.

When the own layer reserves the path of the main signal (step 306) before receiving the path reservation notice from the other layer, the layer sends this fact as the path reservation notice to the other layer (step 307).

Figure 4:
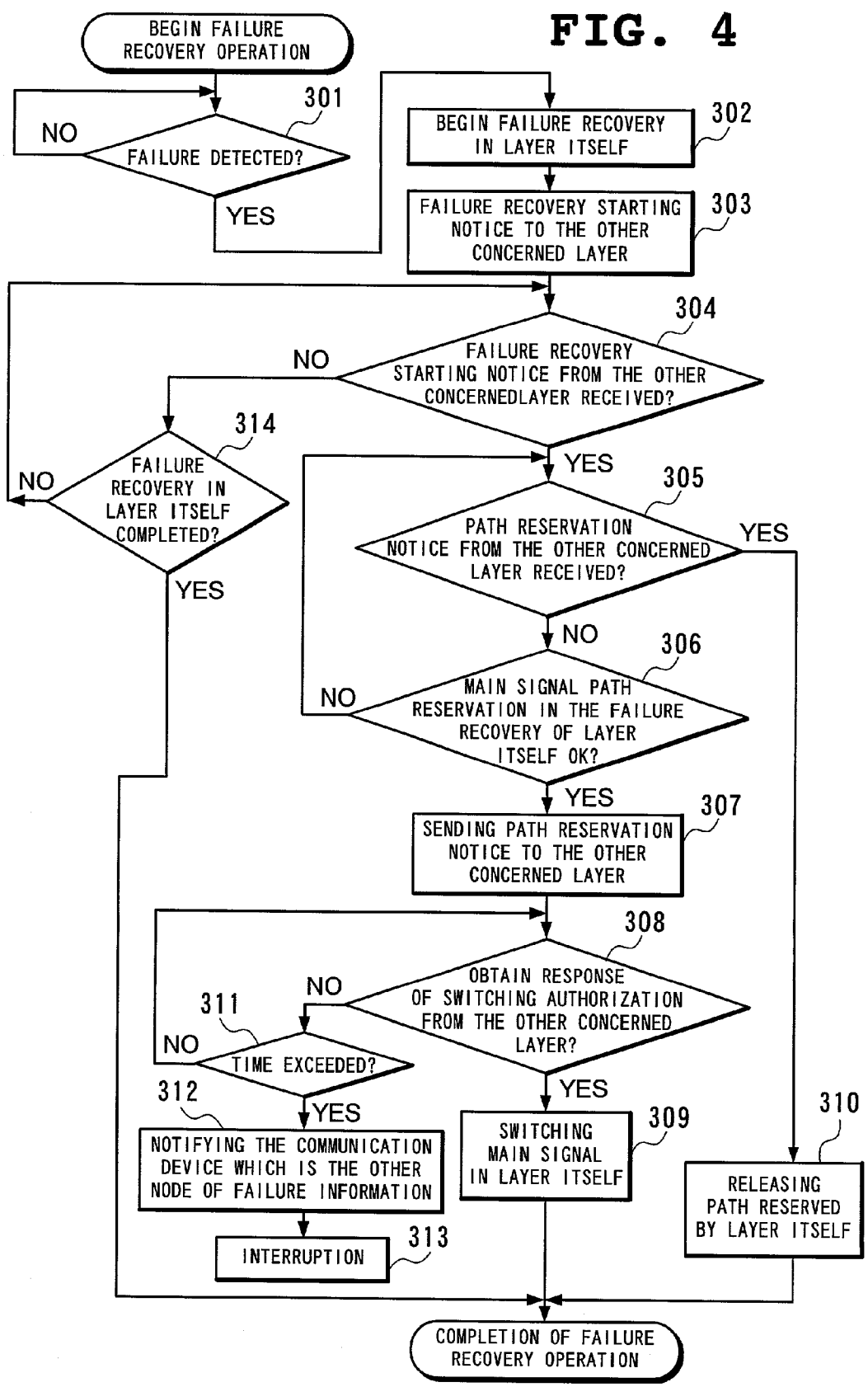
FIG. 4 is a flowchart describing the contents of failure recovery processing by the communication device according to the first embodiment.

When receiving a switch authorization response (Yes in step 308) to the path reservation notice that was sent in step 307, the main signal is switched in the own layer (step 309) to complete the failure recovery operation In addition, as a preventive measure in a case where a response is not sent back because a failure occurred in the inter-layer failure recovery information communication path of the inter A-B layer failure recovery information communication terminal and processing units 103 and 104, an algorithm is provided, in FIG. 4, in which time is measured by the timer units 105 and 106 in step 311 and, when a response is not sent back even after a time set in the timer units 105 and 106 has elapsed, the communication device that is the other node is notified of the information related to the failure (step 312), and the failure recovery operation is interrupted (step 313) to seek a decision from an operator.

Next, the failure recovery method according to a second embodiment of the present invention will be described with reference to FIGS. 5, 6.

The second embodiment has a configuration in which only either one of the layers first performs the failure recovery operation in priority, and the other layer does not start the failure recovery operation until it is verified that the time since it is recognized that the layer having priority failed in the failure recovery operation, or the failure was identified exceeds the preset time. In addition, the configuration of the communication device 100 is the same as that of the first embodiment shown FIG. 1.

With the example of FIG. 5, a case where the failure recovery operation of the B layer is set to be started in priority will be explained. As to which layer failure recovery operation is prioritized, for example, is based on the average failure recovery time of layers (prioritize the layer failure recovery operation that has a shorter failure recovery time).

Figure 5:
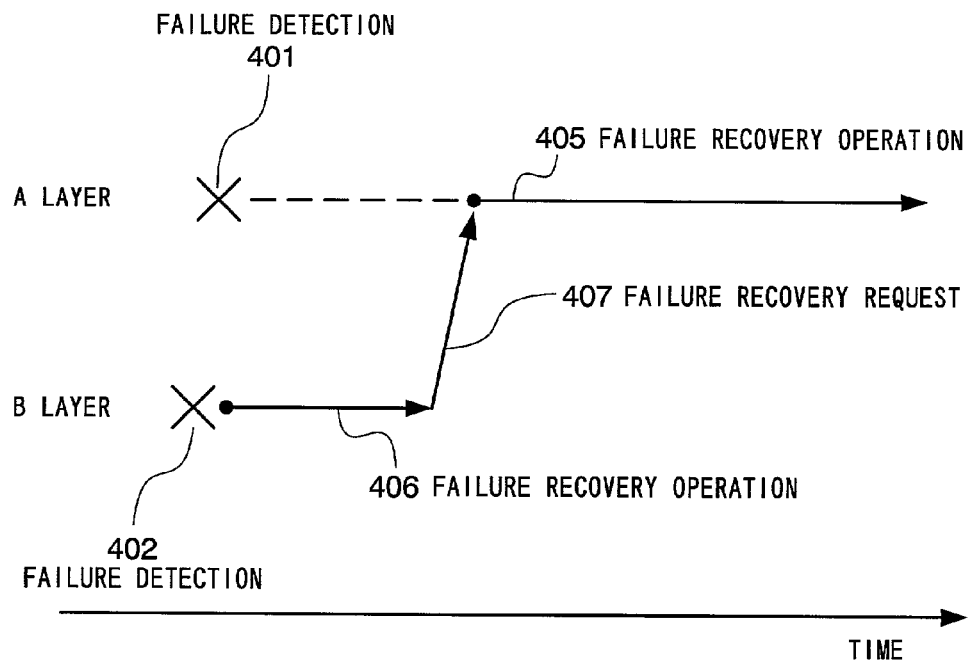
FIG. 5 is a timing chart describing a first example of the failure recovery method according to a second embodiment of the present invention.

In FIG. 5, reference numerals 401 and 402 are times of failure detection in the layers A and B, reference numerals 405 and 406 are the failure recovery operations of the layers A and B, and reference numeral 407 is failure recovery request that is an inter-layer message from the B layer to the A layer.

Although the failure is detected in the A layer at time 401, and in the B layer at time 402, because this is a system in which the B layer starts the failure recovery in priority, the B layer starts the failure recovery operation in advance as indicated in the failure recovery operation 406.

As a result, the algorithm ends when the failure recovery is completed in the B layer.

However, when the B layer recognizes that failure recovery cannot be performed in the B layer, it sends a message to the other A layer, which is a failure recovery request 407 from the B layer to the A layer, as shown.

The A layer that receives the failure recovery request 407 starts the failure recovery in the A layer.

Figure 6:
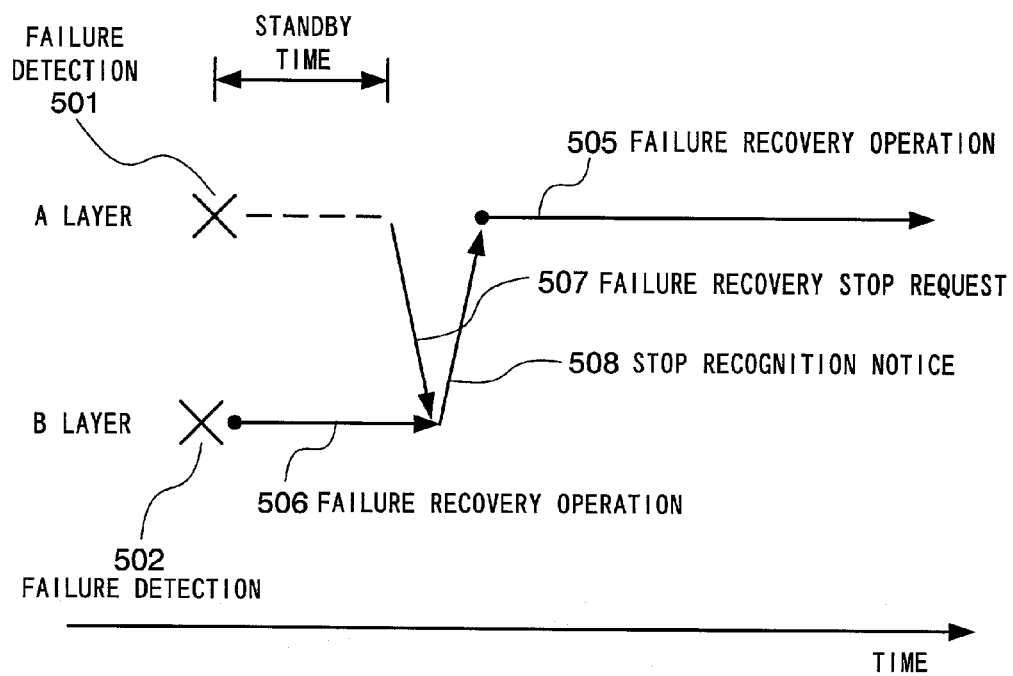
FIG. 6 is a timing chart describing a second example of the failure recovery method according to the second embodiment of the present invention.

On the other hand, considering the case where the failure recovery request 407 message is not sent at all from the B layer to the A layer, although the failure recovery is not completed, as shown in FIG. 6, the timer is set at the time when the A layer detected the failure, to measure a specified time (standby time) until the failure recovery stop request is sent in case the failure recovery request message is not sent from the B layer to the A layer. The time is set, for example, to be longer than the average failure recovery time in the B layer.

In FIG. 6, reference numerals 501 and 502 are the times of failure detection of the A layer and the B layer, respectively, and reference numerals 505 and 506 are the failure recovery operations in the A layer and B, respectively.

In addition, reference numeral 507 is a failure recovery stop request, and reference numeral 508 is a stop recognition notice.

In case the failure recovery request message from the B layer is not received even when the value of the timer has exceeded the preset time, the A layer starts the failure recovery, so that the A layer sends the B layer the failure recovery stop request 507, which is a message requesting to stop the failure recovery in the B layer. As a response to the latter from the B layer, when the stop recognition notice 508 is sent back, the failure recovery operation 505 starts in the A layer. If the response is not sent back, the operation is interrupted to seek a decision from an operator.

The operation of the B layer in the automatic failure recovery according to the above-mentioned second embodiment will be described with reference to the flowchart of FIG. 7.

When a failure is detected in step 601, the failure recovery operation starts in the own layer (step 602). When the failure recovery is completed in only the own layer (B layer), the failure recovery operation in the B layer is completed (step 606).

When it is found that the failure recovery is impossible in the own layer ("Yes" in step 603) from the time and such measured by the timer unit 106 of the own layer, the own layer sends a failure recovery request, which is a message that requests the other concerned layer (A layer in the example shown in FIG. 5) to perform the failure recovery in the A layer (step 604), and ends its operation (step 605).

The operation of the A layer in the automatic failure recovery according to the above-mentioned second embodiment will be described with reference to the flowchart in FIG. 8.

When a failure is detected in step 701, since the failure recovery by the B layer has been set to priority, the A layer does not start the failure recovery operation and enters a standby mode temporarily (step 702).

When the failure recovery request is received ("Yes" in step 740) from the other layer (B layer in this example), the failure recovery in the A layer starts (step 705).

If the failure of the own layer has not been recovered ("Yes" in step 703 and "Yes" in step 704) even after the preset standby time (generally, it is set to be longer than the average failure recovery time in the B layer) has elapsed, the failure recovery starts, so that the message of the failure recovery stop request that requests to stop the failure recovery in the B layer is sent to the other layer (B layer) (step 707).

If there is a stop recognition notice response from the B layer ("Yes" in step 708), the failure recovery in the own layer (A layer) starts (step 706).

If there is no stop recognition notice response from the B layer (No in step 705) within the preset time (step 709), in this example, the operation is interrupted (step 710) to seek a decision from an operator.

The automatic failure recovery function of the communication device according to the present invention is achieved by implementing a protocol having an algorithm of the above-mentioned flowchart in the inter A-B layer failure recovery information communication terminal and processing units 103 and 104.

According to the configuration of the above-mentioned embodiment, by starting failure recovery operation of any layer after a failure has been detected without calculating which layer is the best suited to perform failure recovery on upon detection of the failure and, if the failure cannot be recovered in the layer, performing the failure recovery in the other layer, or by starting failure recovery immediately after each layer has detected the failure, and adjusting subsequently (selecting a bypass to a layer that seems to recover the failure faster), the calculations related to layer optimality that calculate which layer is the best suited to perform failure recovery on can be omitted and shortening of the failure recovery time can be expected.

In addition, since the failure recovery operation between the layers can be adjusted without going through the NMS, up-scaling of the NMS can be prevented without applying loads to the NMS.

Further, since the centralized control by the NMS is unnecessary by distributing and processing by a unit for processing failure recovery information between the layers that is given between each layer, the operation can be performed in the event of a failure of the NMS.

In addition, the present invention may be achieved with the other configurations without being limited to the configurations explained in the above-mentioned embodiments.

Figure 9:
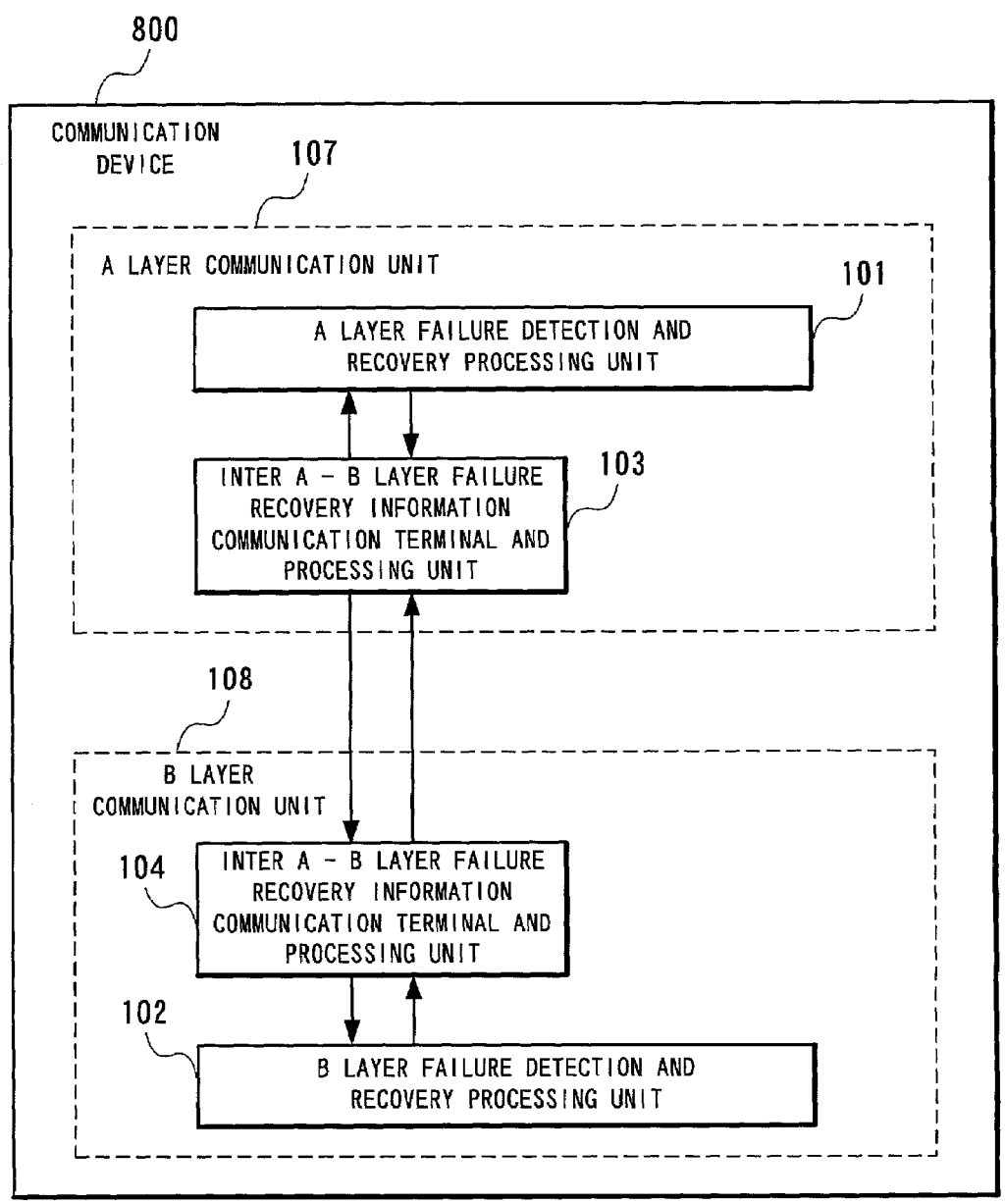
FIG. 9 is a block diagram showing the configuration of the communication device according to a third embodiment of the present invention.

In FIG. 1, although the timer units 105 and 106 were used for both layers A and B, a timer is unnecessary when a method is used, which, for example, in regard to the response to the inter-layer failure recovery information message, switches the main signal in the B layer (one layer) instantaneously, without waiting for a switch authorization, such that a configuration may be adopted in which the timer units 105 and 106 are omitted as in a communication device 800 shown in FIG. 9 which is a third embodiment of the present invention.

Figure 7:
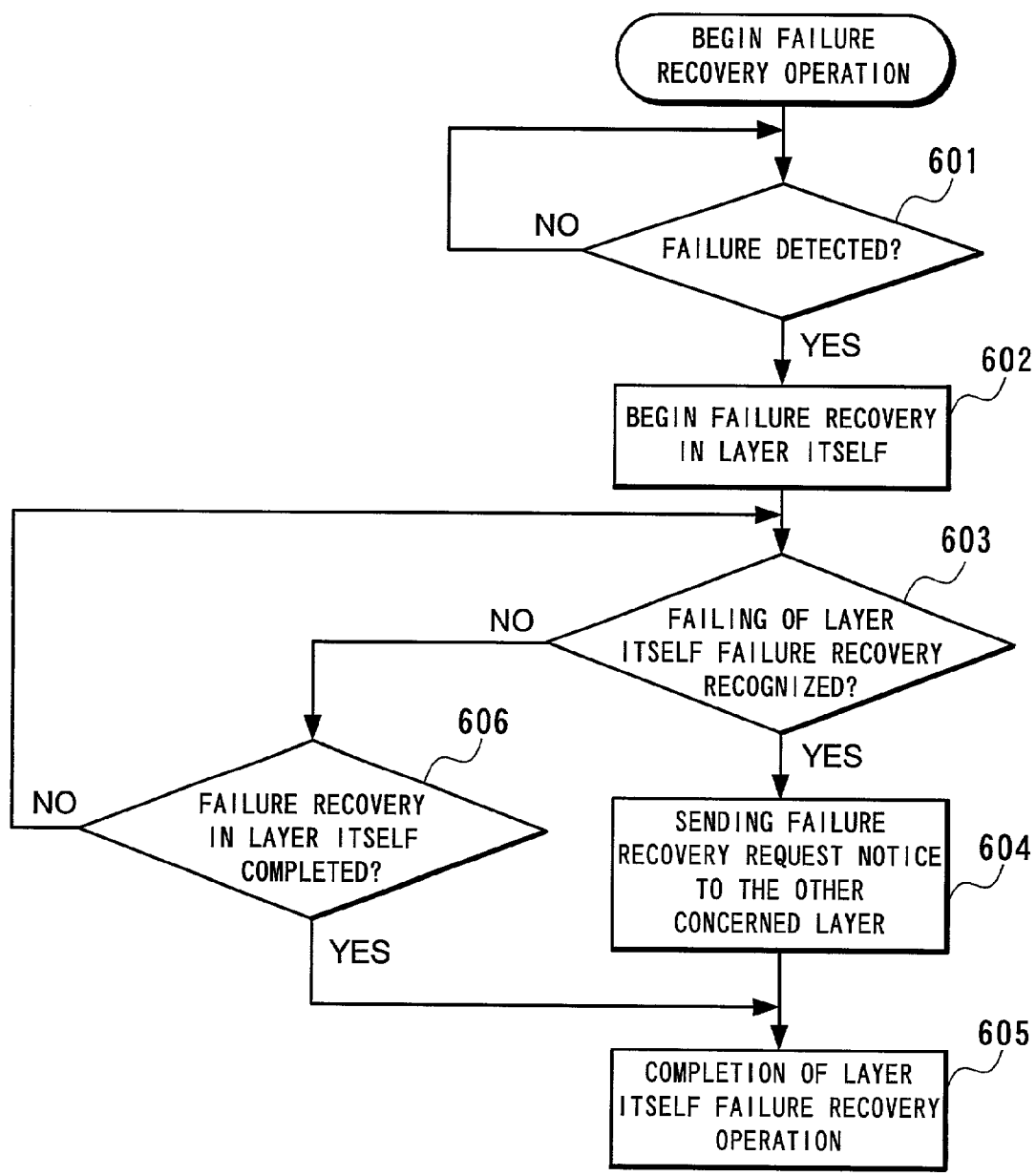
FIG. 7 is a flowchart describing the operation of one layer in the failure recovery method according to the second embodiment.
Figure 8:
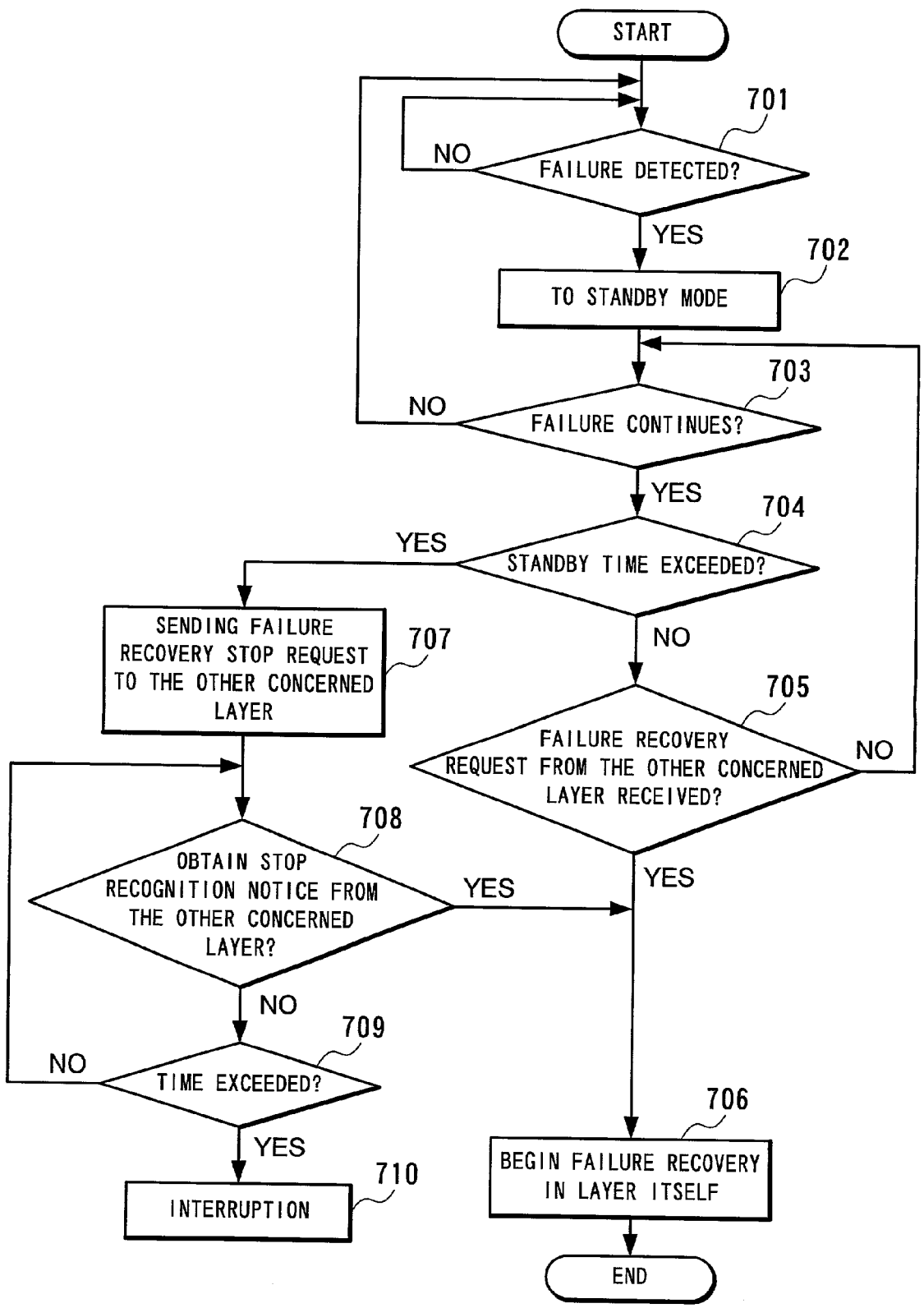
FIG. 8 is a flowchart describing the operation of the other layer in the failure recovery method according to the second embodiment.
Figure 10:
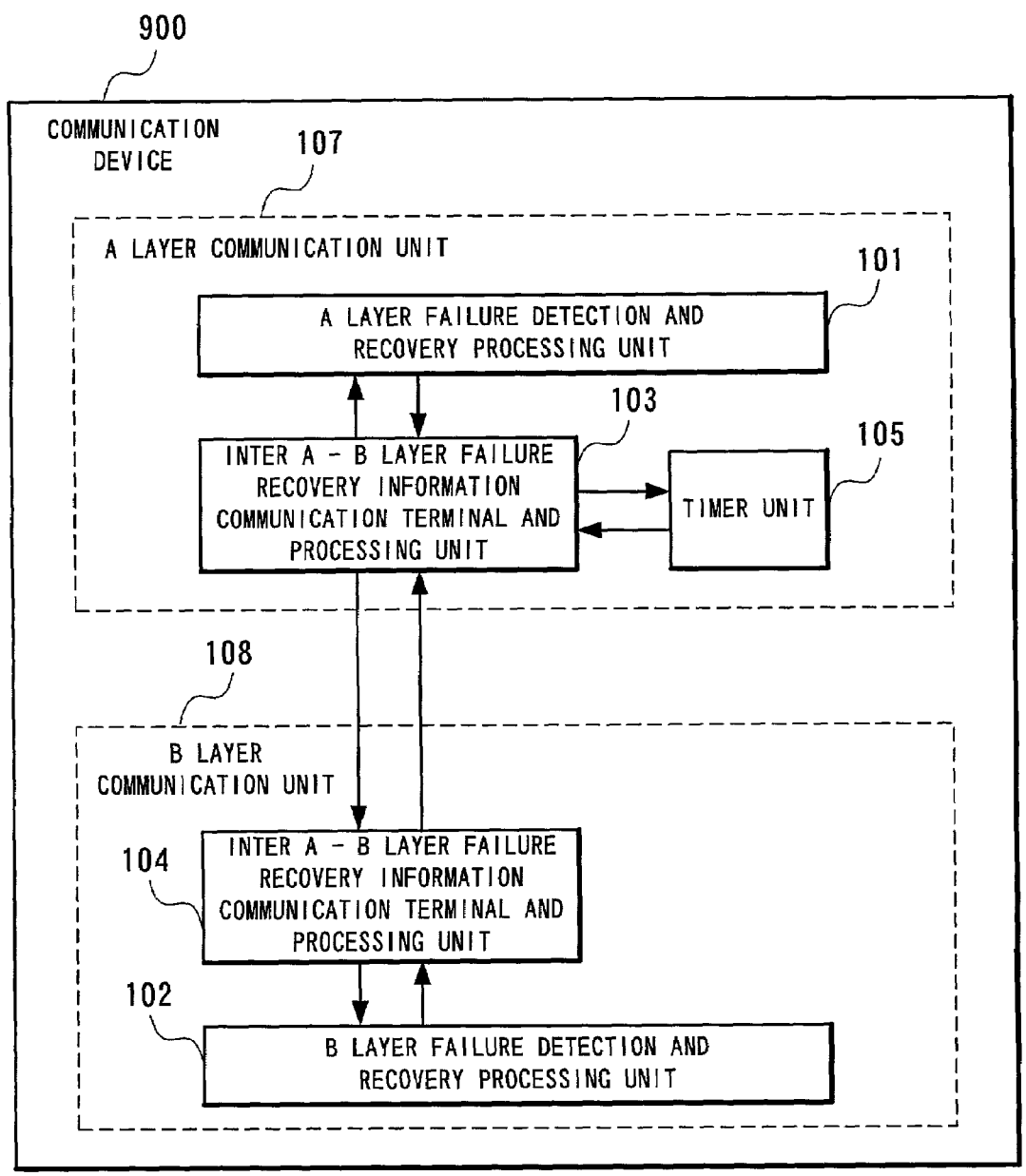
FIG. 10 is a block diagram showing the configuration of the communication device according to a fourth embodiment of the present invention.

Further, considering that a timer is not used in the process in the B layer in FIG. 7 although a timer is used for the process in the A layer shown in FIG. 8, a configuration may be adopted in which only one layer (A layer) has a timer unit as in a communication device 900 shown in FIG. 10 which is a fourth embodiment of the present invention.

Moreover, when a response is not received from the other layer in the flowcharts of FIGS. 4 and 8, the content of the process was to interrupt and seek a decision from an operator; however, the present invention may be realized without any trouble by using an algorithm that performs switching operation without interruption (for example, Yes in step 311 to step 309 in FIG. 4, and Yes in step 709 to step 706 in FIG. 8).

Figure 11:
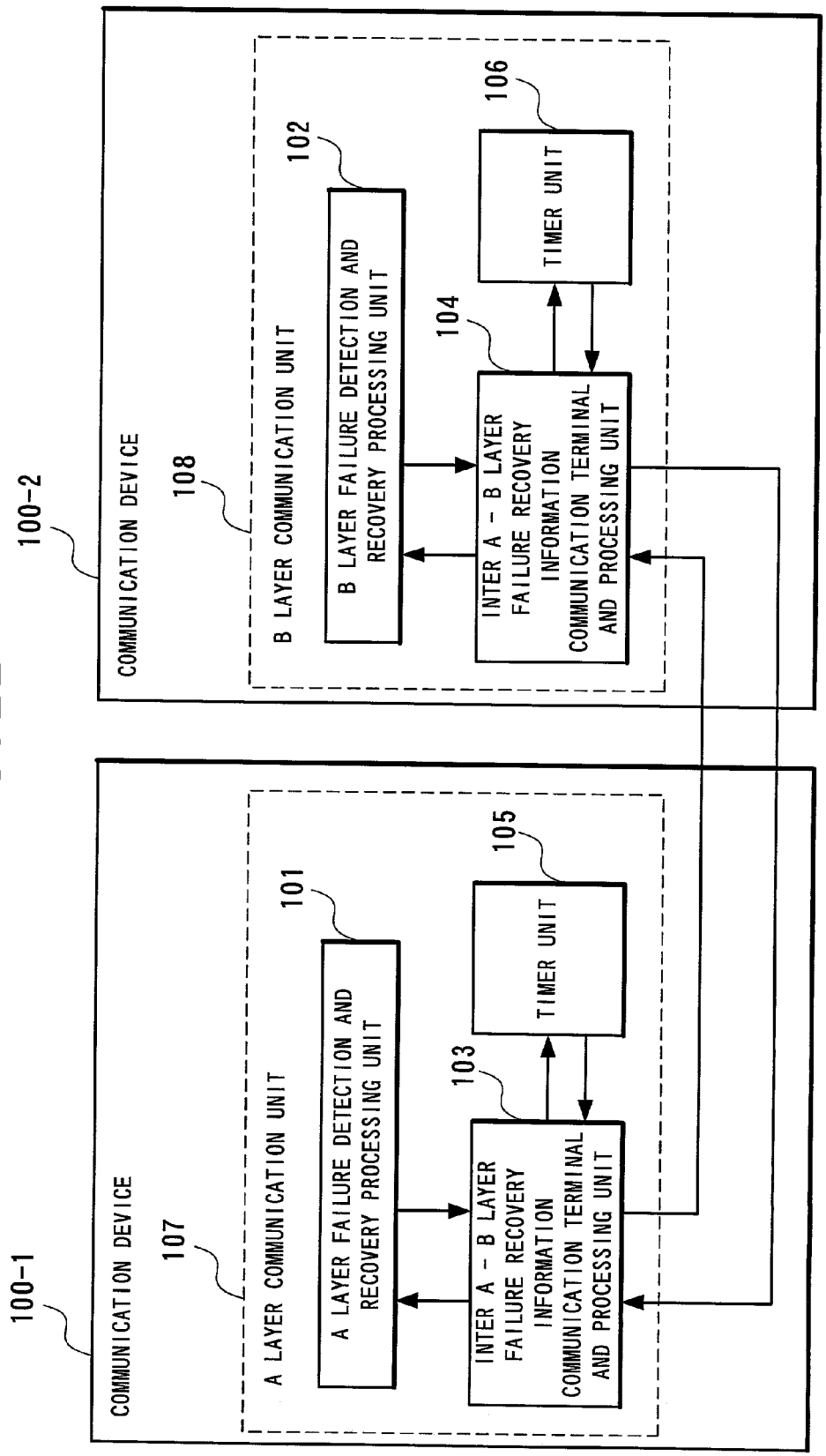
FIG. 11 is a block diagram showing the configuration of the communication device according to a fifth embodiment of the present invention.

In addition, although the above-mentioned embodiment shows a configuration in which the communication device 100 includes the A layer communication unit 107 and the B layer communication unit 108, and the inter A-B layer failure recovery information communication terminal and processing units 103 and 104 are connected, the present invention may be applied even if the inter A-B layer failure recovery information communication units are geographically separated from each other. As a fifth embodiment of the present invention, the configuration of such a communication device is shown in FIG. 11. In FIG. 11, the communication device 100-1 and the communication device 100-2 are disposed geographically separated from each other, the communication device 100-1 includes an A layer communication unit 107, and the communication device 100-2 includes a B layer communication unit 108. The inter A-B layer failure recovery information communication terminal and processing units 103 and 104 are connected to each other between the communication devices 100-1 and 100-2. Since the operation is similar to that of above-mentioned embodiment, explanation is omitted.

Figure 14:
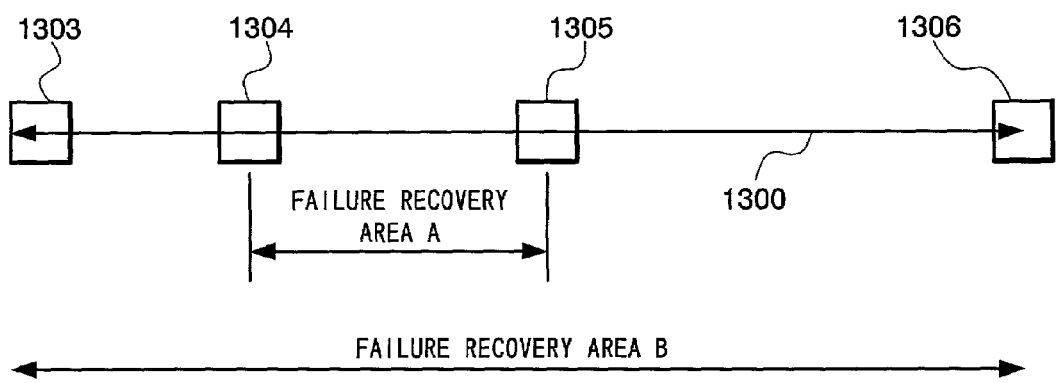
FIG. 14 is a drawing showing relation between a conventional path and a failure recovery area.

The failure recovery of a network involved in different layers has been described above, and it may be applied to a network in which multiple failure recovery areas (failure recovery section) are nested with respect to one path in the same layer as shown in FIG. 14.

Figure 12:
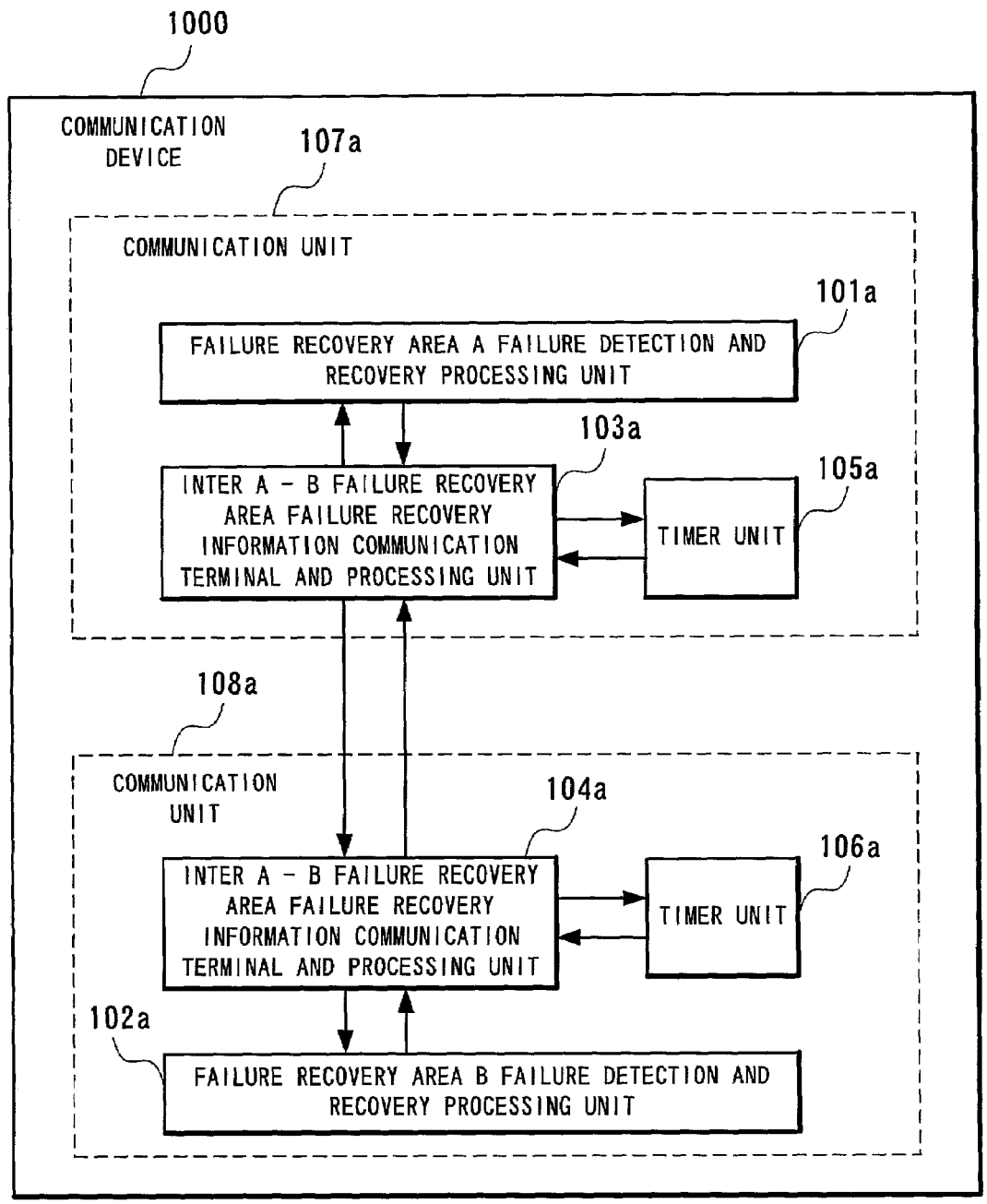
FIG. 12 is a block diagram showing the configuration of the communication device according to a sixth embodiment of the present invention.
Figure 13:
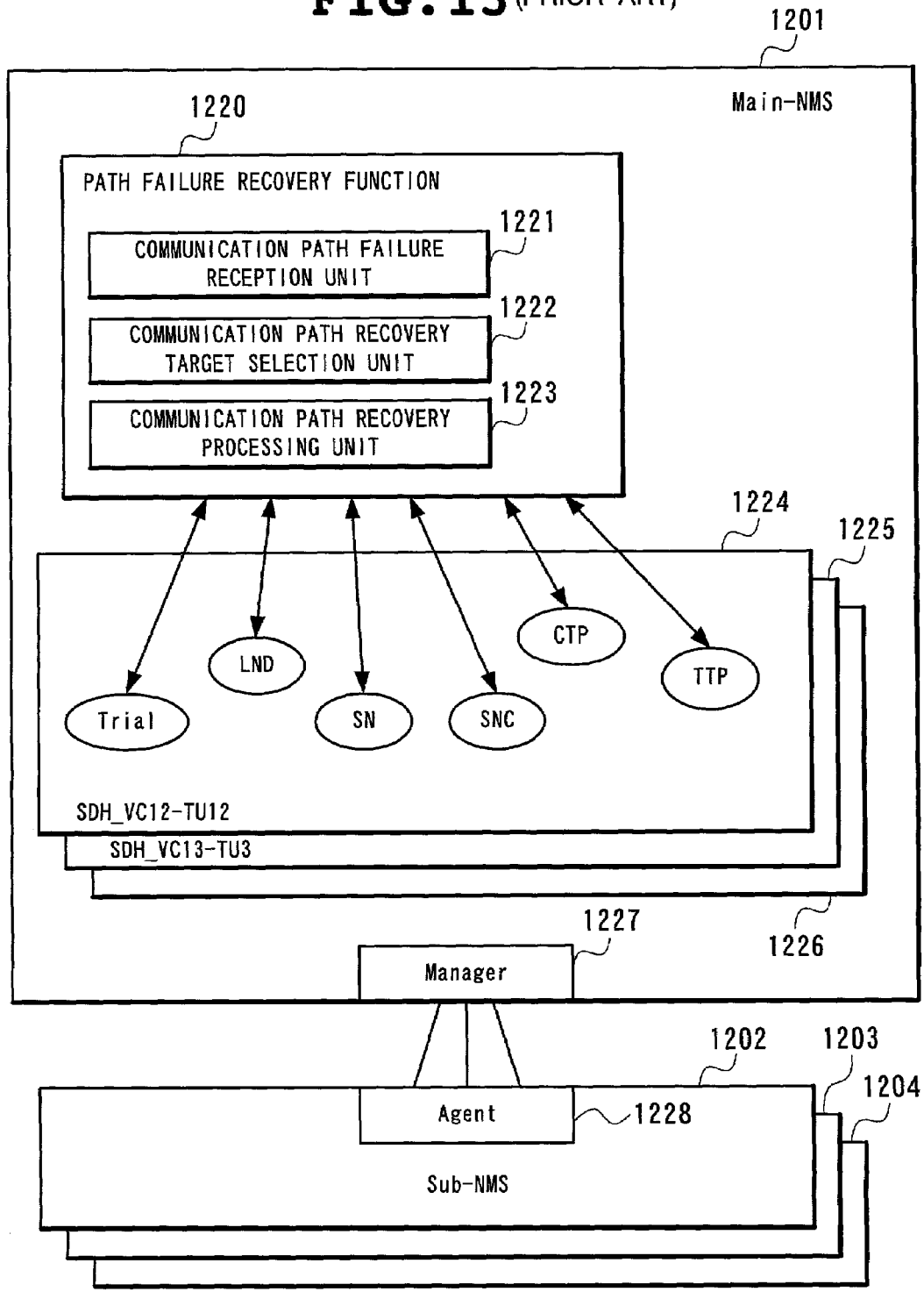
FIG. 13 is a block diagram showing an example of a conventional communication system.

An example of configuration of a communication device according to a sixth embodiment of the present invention applied to the network in which multiple failure recovery areas are nested is shown in FIG. 12. In FIG. 12, the communication device 1000 includes the communication unit 107a and 108a, wherein the communication unit 107a includes a failure recovery area A failure detection and recovery processing unit 101a, a communication terminal and processing unit 103a, and a timer unit 105a, and the communication unit 108a includes a failure recovery area B failure detection and recovery processing unit 102a, a communication terminal and processing unit 104a, and a timer unit 106a. Each component operates in the similar fashion to corresponding components of the embodiment shown in FIG. 1, and similar effects are achieved.

In addition, even if the failure recovery information communication units between the A-B layers or the failure recovery information communication units between the A-B failure recovery areas are separated geographically from each other, or each failure recovery area is not nested, by using the protocol capable of specifying a target node and such for communication, the respective failure recovery areas can communicate with each other, so that the method of the present invention that starts the failure recovery operation simultaneously and adjusts afterwards, and another method of the present invention that only one of the layers operates in advance and, if it fails in its area, it makes a request the other failure recovery area may be applied.

For example, examples in which the failure recovery areas are not nested include the case where the failure recovery areas are not overlapped at all (for example, in FIG. 14, cases where the failure recovery areas of nodes 1303–1304 and the failure recovery areas of the nodes 1305–1306 are included), and the case where the failure recovery areas are partially overlapped (this is a so-called overlap, and is the case in FIG. 14 where the failure recovery areas of nodes 1303–1305 and the failure recovery areas of the nodes 1304–1306 are included).

In addition, the automatic failure recovery method in the communication device of the embodiment can achieve the function of the respective elements of the communication device, obviously through hardware, and also by loading into the memory of a computer processor an automatic failure recovery program that includes each function in a computer program. The automatic failure recovery program is stored on a magnetic disk, a semiconductor memory, and other recording medium 2000 as shown in FIG. 1. Then, it is loaded from the recording medium 2000 into the computer processor, and controls the operation of the computer processor to achieve the above-mentioned functions.

The preferred embodiments have been listed above to describe the present invention, however, the present invention is not necessarily limited to the above embodiments, and may be realized by making various changes within the scope of the technical thought.

For example, in the above-mentioned embodiment, the case where the present invention is applied to two layers (A and B) or to two failure recovery areas is explained, however, the number of layers or failure recovery areas is not limited to those, and the present invention can be applied to two or more layers or failure recovery areas similarly.

As described above, according to the communication device and the automatic failure recovery method of the present invention, effects as described below can be achieved.

First, calculations related to layer optimality that calculate which layer is the best suited to perform failure recovery on, with respect to a network in which multiple failure recovery areas exist can be omitted, or calculations related to layer optimality that calculate which failure recovery area is the best suited to use also with respect to a network in which multiple failure recovery areas exist with respect to one path in a layer can be omitted, thereby shortening of failure recovery time.

Second, since the failure recovery operation between the layers and the failure recovery operation between the failure recovery areas can be adjusted without going through the NMS, up-scaling of the NMS can be prevented without applying loads to the NMS.

Third, since the centralized control by the NMS is unnecessary by distributing and processing by a unit for processing failure recovery information between the layers that is given between each layer, or for processing failure recovery information between the failure recovery areas that is given between each failure recovery areas, the operation can be performed in the event of a failure of the NMS.

Fourth, since the failure recovery operation can be adjusted without going through the NMS, up-scaling of the NMS can be prevented without applying loads to the NMS.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication device having a failure recovery function for multiple layers, comprising:
    failure detection and recovery processing means for processing failure detection and failure recovery of each layer; and
    failure recovery information processing means for performing communication and information processing of failure recovery information between multiple layers,
    said failure detection and recovery processing means of each layer being activated when a failure is detected in multiple layers,
    operations being performed up to immediately before switching a main signal, the first layer to reach the stage immediately before notifying the other layer of this fact through said failure recovery information processing means to stop the failure recovery operation of the other layer,
    the other layer sending back an authorization response through said failure recovery information processing means, and the first layer to reach the stage immediately before actually switching the main signal based on the response result.

2. A communication device as set forth in claim 1,
    wherein one previously mentioned layer is set to start failure recovery operation in priority over the other layer, the layer notifies the other layer of the fact through said failure recovery information processing means when recognizing failure recovery fails, and the other layer starts the failure recovery operation.

3. A communication device as set forth in claim 2,
    wherein the device comprises timer means only on the layer which is not set to perform the failure recovery operation in priority,
    the layer being notified of a stop request during failure recovery operation at the time of exceeding a standby time set by said timer means, and the failure recovery operation being started at the time of receiving the response from the layer.

4. A communication device as set forth in claim 1,
    wherein said device further comprises timer means for each multiple layers,
    the failure recovery operation being interrupted when there is no authorization response notification from the other layer within a specified time.

5. A communication device having a failure recovery function in a network consisting of multiple layers,
    each communication device consisting of:
    failure detection and recovery processing means for processing failure detection and failure recovery of each layer; and
    failure recovery information processing means for performing communication and information processing of failure recovery information between layers in which a failure is recovered by the other communication device,
    said failure detection and recovery processing means of each communication device being activated when a failure is detected in multiple layers,
    operations being performed up to immediately before switching a main signal, the first layer to reach the stage immediately before notifying the communication device of the other layer of this fact through said failure recovery information processing means to stop the failure recovery operation of the other layer,
    the communication device of the other layer sending back an authorization response through said failure recovery information processing means, and the first layer to reach the stage immediately before actually switching the main signal based on the response result.

6. An automatic failure recovery method of a communication network having a failure recovery function for multiple layers, comprising the steps of:
    when a failure is detected in the multiple layers,
    starting each failure recovery operation in the multiple layers; and completing the failure recovery operation only in the layer that ended the failure recovery operation in advance.

7. An automatic failure recovery method of a communication network having a failure recovery operation for multiple layers, which performs failure recovery switching a path of a signal in which a failure has occurred to a physically different path, comprising the steps of:
when the failure is detected in the multiple layers,
starting the failure recovery operation only in a specific layer having priority, and
starting the failure recovery operation in another layer, by recognizing that the specific layer having priority failed in the failure recovery operation, when the another layer recognizes a failure recovery request that the another layer has been notified of.

8. An automatic failure recovery method of a communication network having a failure operation for multiple layers, which performs failure recovery by switching a path of a signal in which a failure has occurred to a physically different path, comprising the steps of:
when the failure is detected in the multiple layers,
starting the failure recovery operation only in a specific layer having priority, and
starting the failure recovery operation in another layer when a time since the failure was detected in the another layer exceeds a preset time.

9. An automatic failure recovery method of a communication network having a failure recovery operation for multiple layers, performs failure recovery by switching a path of a signal in which a failure has occurred to a physically different path, comprising the steps of:
when the failure is detected in the multiple layers,
starting the failure recovery operation only in a specific layer having priority, and
starting the failure recovery operation in another layer, by recognizing that the specific layer having priority failed in the failure recovery operation, when the another layer recognizes a failure recovery request that the another layer has been notified of, or when a time since the failure was detected in the another layer exceeds a preset time.

10. A communication device having a failure recovery function of multiple failure recovery areas on a network, comprising:
failure detection recovery processing means for processing the failure detection and failure recovery of each failure recovery area; and
failure recovery information processing means for performing communication and information processing of failure recovery information between multiple failure recovery areas,
said failure detection recovery processing means in each failure recovery area being activated when failure is detected in the multiple failure recovery areas to perform operations up to immediately before switching a main signal,
the first failure recovery area to reach a stage immediately before notifying the other failure recovery area of this fact through said failure recovery information processing means to stop the failure recovery operation of the other failure recovery area,
the other failure recovery area sending back an authorization response through said failure recovery information processing means, and the first failure recovery area to reach the stage immediately before actually switching the main signal based on the response result.

11. A communication device as set forth in claim 10,
wherein one previously mentioned failure recovery area is set to start failure recovery operation in priority over the other failure recovery area, the failure recovery area notifies the other failure recovery area of the fact through said failure recovery information processing means when recognizing failure recovery fails, and the other failure recovery area starts the failure recovery operation.

12. A communication device as set forth in claim 11,
wherein the device comprises timer means only on the failure recovery area which is not set to perform the failure recovery operation in priority,
the failure recovery area being notified of a stop request during failure recovery operation at the time of exceeding a standby time set by said timer means, and the failure recovery operation being started at the time of receiving the response from the failure recovery area.

13. A communication device as set forth in claim 10,
wherein the communication device comprises timer means for each of the multiple failure recovery areas,
the failure recovery operation being interrupted when there is no authorization response notification from the other failure recovery area within a specified time.

14. A communication device having a failure recovery function in a network having multiple failure recovery areas, comprising:
each communication device consisting of:
failure detection recovery processing means for processing the failure detection and failure recovery of each failure recovery area; and
failure recovery information processing means for performing communication and information processing of failure recovery information between failure recovery areas in which a failure is recovered by the other communication device,
said failure detection recovery processing means in each communication device being activated when failure is detected in the multiple failure recovery areas to perform operations up to immediately before switching a main signal,
the first failure recovery area to reach a stage immediately before notifying the communication device of the other failure recovery area of this fact through said failure recovery information processing means to stop the failure recovery operation of the communication device of the other failure recovery area,
the communication device of the other failure recovery area sending back an authorization response through said failure recovery information processing means, and the first failure recovery area to reach the stage immediately before actually switching the main signal based on the response result.

15. An automatic failure recovery method of a communication network having a failure recovery function for multiple failure recovery areas, comprising the steps of:
when a failure is detected in the multiple failure recovery areas,
starting each failure recovery operation in the multiple failure recovery areas; and
completing the failure recovery operation only in the failure recovery area that ended the failure recovery operation in advance.

16. An automatic failure recovery method of a communication network having a failure recovery operation of multiple failure recovery areas, which performs failure recovery by switching a path of a signal in which a failure has occurred to a physically different path, comprising the steps of:

when the failure is detected in the multiple failure recovery areas,
starting the failure recovery operation only in a specific failure recovery area having priority, and
starting the failure recovery operation in another failure recovery area, by recognizing that the specific failure recovery area having priority failed in the failure recovery operation, when the another failure recovery area recognizes a failure recovery request that the another failure recovery area has been notified of.

17. An automatic failure recovery method of a communication network having a failure recovery operation of multiple failure recovery areas, which performs failure recovery by switching a path of a signal in which a failure has occurred to a physically different path, comprising the steps of:

when the failure is detected in the multiple failure recovery areas,
starting the failure recovery operation only in a specific failure recovery area having priority, and
starting the failure recovery operation in another failure recovery area when a time since the failure was detected in the another failure recovery area exceeds a preset time.

18. An automatic failure recovery method of a communication network having a failure recovery operation of multiple failure recovery areas, which performs failure recovery by switching a path of a signal in which a failure has occurred to a physically different path, comprising the steps of:

when the failure is detected in the multiple failure recovery areas,
starting the failure recovery operation only in a specific failure recovery area having priority, and
starting the failure recovery operation in another failure recovery area, by recognizing that the specific failure recovery area having priority failed in the failure recovery operation, when the another failure recovery area recognizes a failure recovery request that the another failure recovery area has been notified of, or when a time since the failure was detected in the another failure recovery area exceeds a preset time.

19. A communication network system in which a communication device having a failure recovery function of multiple layers is placed as a node, said communication device comprising:
failure detection recovery processing means for processing failure detection and failure recovery of each layer; and
failure recovery information processing means for performing communication and information processing of failure recovery information between the multiple layers,
said failure detection recovery processing means in each layer being activated when failure is detected in the multiple layers to perform operations up to immediately before switching a main signal,
the first layer to reach a stage immediately before notifying the other layer of this fact through said failure recovery information processing means to stop the failure recovery operation of the other layer,
the other layer sending back an authorization response through said failure recovery information processing means, and the first layer to reach the stage immediately before actually switching the main signal based on the response result.

20. A network system as set forth in claim 19,
wherein one previously mentioned layer is set to start failure recovery operation in priority over the other layer, the layer notifies the other layer of the fact through said failure recovery information processing means when recognizing failure recovery fails, and the other layer starts the failure recovery operation.

21. A network system as set forth in claim 19,
wherein said communication device comprises:
timer means for each multiple layers,
the failure recovery operation being interrupted when there is no authorization response notification from the other layer within a specified time.

22. A network system as set forth in claim 20,
wherein said communication device comprises:
timer means only on the layer which is not set to perform the failure recovery operation in priority,
the layer being notified of a stop request during failure recovery operation at the time of exceeding a standby time set by said timer means, and the failure recovery operation being started at the time of receiving the response from the layer.

23. A communication network system placed as a communication device node having a failure recovery function in a network consisting of multiple layers, each communication device consisting of:
failure detection recovery processing means for processing failure detection and failure recovery of each layer; and
failure recovery information processing means for performing communication and information processing of failure recovery information between layers in which a failure is recovered by the other communication device,
said failure detection recovery processing means in each communication device being activated when failure is detected in the multiple layers to perform operations up to immediately before switching a main signal,
the first layer to reach a stage immediately before notifying the communication device of the other layer of this fact through said failure recovery information processing means to stop the failure recovery operation of the other layer,
the communication device of the other layer sending back an authorization response through said failure recovery information processing means, and the first layer to reach the stage immediately before actually switching the main signal based on the response result.

24. A communication network system that has a communication device having a failure recovery function of multiple failure recovery areas on a network, said communication device comprising:
failure detection recovery processing means for processing the failure detection and failure recovery of each failure recovery area; and
failure recovery information processing means for performing communication and information processing of failure recovery information between the multiple failure recovery areas,
said failure detection recovery processing means in each failure recovery area being activated when failure is detected in the multiple failure recovery areas to perform operations up to immediately before switching a main signal, the first failure recovery area to reach a stage immediately before notifying the other failure recovery area of this fact through said failure recovery information processing means to stop the failure recovery operation of the other failure recovery area, the other failure recovery area sending back an authorization response through said failure recovery information processing means, and the first failure recovery area to reach the stage immediately before actually switching the main signal based on the response result.

25. A network system as set forth in claim 24, wherein one previously mentioned failure recovery area is set to start failure recovery operation in priority over the other failure recovery area, the failure recovery area notifies the other failure recovery area of the fact through said failure recovery information processing means when recognizing failure recovery fails, and the other failure recovery area starts the failure recovery operation.

26. A network system as set forth in claim 25, said communication device comprising:

timer means only on the failure recovery area which is not set to perform the failure recovery operation in priority, the failure recovery area being notified of a stop request during failure recovery operation at the time of exceeding a standby time set by said timer means, and the failure recovery operation being started at the time of receiving the response from the failure recovery area.

27. A network system as set forth in claim 24, said communication device comprising:

timer means for each of the multiple failure recovery areas, the failure recovery operation being interrupted when there is no authorization response notification from the other failure recovery area within a specified time.

28. A communication network system that has a communication device having a failure recovery function on a network having multiple failure recovery areas, each communication device comprising:

failure detection recovery processing means for processing the failure detection and failure recovery of each failure recovery area; and failure recovery information processing means for performing communication and information processing of failure recovery information between failure recovery areas in which a failure is recovered by the other communication device, said failure detection recovery processing means in each communication device being activated when failure is detected in the multiple failure recovery areas to perform operations up to immediately before switching a main signal, the first failure recovery area to reach a stage immediately before notifying the communication device of the other failure recovery area of this fact through said failure recovery information processing means to stop the failure recovery operation of the communication device of the other failure recovery area, the communication device of the other failure recovery area sending back an authorization response through said failure recovery information processing means, and the first failure recovery area to reach the stage immediately before actually switching the main signal based on the response result.

29. A storage medium storing an automatic failure recovery program for causing a computer to execute a failure recovery process for a communication device on a communication network having failure recovery operations for multiple layers, the failure recovery process comprising:

starting each failure recovery operation in the multiple layers when failure is detected in the multiple layers; and completing the failure recovery operation only in the layer that ended the failure recovery operation in advance.

30. A computer readable memory which records an automatic failure recovery program to be executed by a computer for controlling a communication device on a communication network having a failure recovery operation for multiple layers to perform failure recovery processing by switching a path of a signal in which a failure has occurred to a physically different path, said automatic failure recovery program comprising the functions of:

a function starting only the failure recovery operation in a specific layer having priority when the failure is detected in the multiple layers; and a function starting the failure recovery operation in another layer, by recognizing that the specific layer having priority failed in the failure recovery operation, when the another layer recognizes a failure recovery request that the another layer has been notified of.

31. A computer readable memory which records an automatic failure recovery program to be executed by a computer for controlling a communication device on a communication network having a failure recovery operation for multiple layers to perform failure recovery processing by switching a path of a signal in which a failure has occurred to a physically different path, said automatic failure recovery program comprising the functions of:

a function starting only the failure recovery operation in a specific layer having priority when the failure is detected in the multiple layers; and a function starting the failure recovery operation in another layer when a time since the failure was detected in the another layer exceeds a preset time.

32. A computer readable memory which records an automatic failure recovery program to be executed by a computer for controlling a communication device on a communication network having a failure recovery operation for multiple layers to perform failure recovery processing by switching path of a signal in which a failure has occurred to a physically different path, said automatic failure recovery program comprising the functions of:

a function starting only the failure recovery operation in a specific layer having priority when the failure is detected in the multiple layers; and a function starting the failure recovery operation in another layer, by recognizing that the specific layer having priority failed in the failure recovery operation, when the another layer recognizes a failure recovery request that the another layer was notified of, or when a time since the failure was detected in the another layer exceeds a preset time.

33. A communication device having failure recovery operations for a first layer and a second layer, the communication device comprising:

a first layer communication unit; and a second layer communication unit;

wherein the first layer communication unit is configured to perform first recovery operations up to immediately before switching a main signal in the event that a failure has occurred in both the first layer and the second layer;

wherein the second layer communication unit is configured to perform second recovery operations up to immediately before switching the main signal in the event that the failure has occurred in both the first layer and the second layer;

wherein the first layer communication unit is configured to send a first path reservation notice to the second layer communication unit in the event that the first layer communication unit has performed the first recovery operations up to immediately before switching the main signal;

wherein the second layer communication unit is configured to send a second path reservation notice to the first layer communication unit in the event that the second layer communication unit has performed the second recovery operations up to immediately before switching the main signal;

wherein the first layer communication unit is configured to stop the first recovery operations and to send a first switch authorization notice to the second layer communication unit in the event that the first layer communication unit receives the second path reservation notice;

wherein the second layer communication unit is configured to stop the second recovery operations and to send a second switch authorization notice to the first layer communication unit in the event that the second layer communication unit receives the first path reservation notice;

wherein the first layer communication unit is configured to complete the first recovery operations in the event that the first layer communication unit receives the second switch authorization notice; and wherein the second layer communication unit is configured to complete the second recovery operations in the event that the second layer communication unit receives the first switch authorization notice.

34. An automatic failure recovery method for a communication device having failure recovery operations for a first layer and a second layer, the automatic failure recovery method comprising:

performing first recovery operations in the first layer up to immediately before switching a main signal in the event that a failure has occurred in both the first layer and the second layer;

performing second recovery operations in the second layer up to immediately before switching the main signal in the event that the failure has occurred in both the first layer and the second layer;

sending a first path reservation notice from the first layer to the second layer in the event that the first layer has performed the first recovery operations up to immediately before switching the main signal;

sending a second path reservation notice from the second layer to the first layer in the event that the second layer has performed the second recovery operations up to immediately before switching the main signal;

stopping the first recovery operations and sending a first switch authorization notice from the first layer to the second layer in the event that the first layer receives the second path reservation notice;

stopping the second recovery operations and sending a second switch authorization notice from the second layer to the first layer in the event that the second layer receives the first path reservation notice;

completing the first recovery operations in the event that the first layer receives the second switch authorization notice; and completing the second recovery operations in the event that the second layer receives the first switch authorization notice.

* * * * *